J. H. ASTRUCK.
COMBINED MATCH STAND AND CIGAR CUTTER.
APPLICATION FILED JAN. 12, 1910.
961,927.
Patented June 21, 1910.
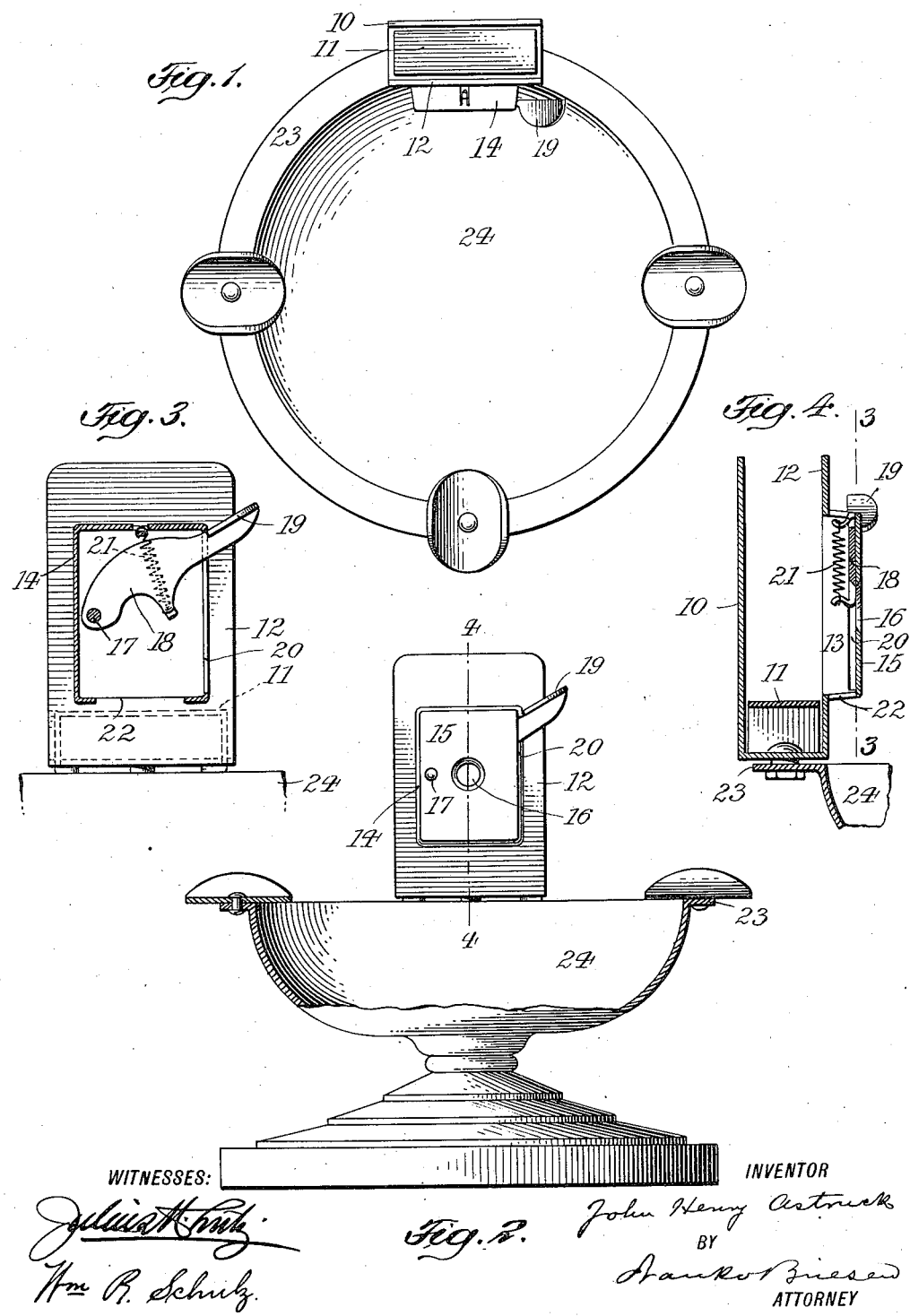

UNITED STATES PATENT OFFICE.

JOHN HENRY ASTRUCK, OF NEW YORK, N. Y.

COMBINED MATCH-STAND AND CIGAR-CUTTER.

961,927.     Specification of Letters Patent.    Patented June 21, 1910.

Application filed January 12, 1910. Serial No. 537,737.

*To all whom it may concern:*

Be it known that I, JOHN HENRY AS-TRUCK, a citizen of the United States, residing at New York city, Manhattan, county and State of New York, have invented new and useful Improvements in Combined Match-Stands and Cigar-Cutters, of which the following is a specification.

This invention relates to a combined match stand and cigar cutter which is of simple construction, convenient in use, and requires a minimum amount of material for its manufacture.

In the accompanying drawing: Figure 1 is a plan of my improved combined match stand and cigar cutter, showing it mounted upon a bowl; Fig. 2 a front view thereof, with the bowl partly in section; Fig. 3 a vertical longitudinal section on line 3—3, Fig. 4, and Fig. 4 a vertical transverse section on line 4—4, Fig. 2.

A U-shaped holder 10, adapted to accommodate a match box, is provided with open ends and a lower rest 11 over which said box is adapted to be projected with its lower end, as usual. From one of the sides, say side 12, of holder 10, projects outwardly a casing 13 which is preferably made integral with said side by stamping. This casing is composed of a continuous rectangular or other rim 14 and of a flat face plate 15, perforated at 16 for the introduction of the cigar tip to be severed. To the inner side of plate 15 there is pivoted at 17, a cutter 18, the handle 19 of which extends outwardly through a slot 20 of rim 14. Cutter 18 is influenced by a spring 21 which serves to retract the same after it has been manually advanced to cut off the cigar. The severed tip is discharged from the casing through a lower outlet opening 22 formed in rim 14.

The holder, constructed as described, is shown to be mounted upon the flange 23 of a bowl 24, in such a position, that discharge opening 22 is located above the body of the bowl. In this way the cigar tips will fall into the bowl, within which they are collected, the bowl serving at the same time as an ash tray and as a support for cigar rests 25 which are riveted to flange 23.

It will be seen that my device is of simple construction, requires a minimum amount of material in its manufacture, and so assembles the parts that they are readily accessible to the smoker. Furthermore, the match stand, besides accommodating the match box, assumes the additional function of constituting a sustaining device for the cutter and of forming an integral part of said cutter.

I claim:

A device of the character described, comprising a U-shaped holder having a lower rest and open ends, an integral casing extending outwardly from one of the sides of the holder and having a flat perforated face plate, and a cutter pivoted to said face plate.

Signed by me at New York city, (Manhattan,) N. Y., this 11th day of January, 1910.

JOHN HENRY ASTRUCK.

Witnesses:
  WM. R. SCHULZ,
  FRANK V. BRIESEN.